(12) United States Patent
Schwach et al.

(10) Patent No.: US 10,181,952 B2
(45) Date of Patent: *Jan. 15, 2019

(54) ENCRYPTION USING BIOMETRIC IMAGE-BASED KEY

(71) Applicant: RapidGPS, LLC, Mendota Heights, MN (US)

(72) Inventors: Jory Schwach, New York, NY (US); Brian Bosak, Brooklyn Park, MN (US)

(73) Assignee: RAPIDGPS, LLC, Mendota Heights, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/801,031

(22) Filed: Nov. 1, 2017

(65) Prior Publication Data

US 2018/0123798 A1    May 3, 2018

Related U.S. Application Data

(63) Continuation of application No. 14/527,321, filed on Oct. 29, 2014, now Pat. No. 9,813,246.

(60) Provisional application No. 61/897,215, filed on Oct. 29, 2013, provisional application No. 61/939,453, filed on Feb. 13, 2014.

(51) Int. Cl.
*H04L 9/32* (2006.01)
*H04L 9/08* (2006.01)
*G09C 5/00* (2006.01)

(52) U.S. Cl.
CPC .............. *H04L 9/3231* (2013.01); *G09C 5/00* (2013.01); *H04L 9/0866* (2013.01); *H04L 9/3226* (2013.01)

(58) Field of Classification Search
CPC .......................... H04L 9/0866; H04L 9/3231
See application file for complete search history.

(56) References Cited

U.S. PATENT DOCUMENTS

| | | | | |
|---|---|---|---|---|
| 9,374,370 | B1* | 6/2016 | Bent, II | H04L 63/0442 |
| 2010/0155608 | A1* | 6/2010 | Devito | G01T 1/00 |
| | | | | 250/363.04 |
| 2011/0264919 | A1* | 10/2011 | Pizano | H04L 9/0866 |
| | | | | 713/186 |
| 2013/0004033 | A1* | 1/2013 | Trugenberger | G06F 21/32 |
| | | | | 382/125 |
| 2013/0318351 | A1* | 11/2013 | Hirano | H04L 9/3073 |
| | | | | 713/168 |
| 2013/0322623 | A1* | 12/2013 | Rinne | G06F 21/10 |
| | | | | 380/44 |

(Continued)

*Primary Examiner* — Joseph P Hirl
*Assistant Examiner* — Sayed Aresh Beheshti Shirazi
(74) *Attorney, Agent, or Firm* — Dykema Gossett PLLC

(57) ABSTRACT

Methods and systems according to the present disclosure improve upon known biometric security systems by not permanently storing (e.g., for later comparison as in known systems) the actual image of the biometric characteristic. Instead, an image of a biometric identifier (e.g., retina, fingerprint, etc.) may be used to form a key which may be used to secure and provide access to data. The key may be formed, in embodiments, using a neural network and/or a random input (e.g., a vector of random characters), for example. The image of the biometric identifier may be discarded, and thus may not be vulnerable to theft. In an embodiment, the key may be used in a key-based encryption system.

6 Claims, 5 Drawing Sheets

(56) References Cited

U.S. PATENT DOCUMENTS

| | | | |
|---|---|---|---|
| 2013/0329967 A1* | 12/2013 | Abiko | G06K 9/00026 |
| | | | 382/115 |
| 2014/0032924 A1* | 1/2014 | Durham | G06F 21/10 |
| | | | 713/186 |
| 2014/0205077 A1* | 7/2014 | Wood | H04M 3/42042 |
| | | | 379/142.01 |
| 2014/0237256 A1* | 8/2014 | Ben Ayed | H04W 12/04 |
| | | | 713/186 |
| 2016/0219046 A1* | 7/2016 | Ballard | H04L 63/0861 |

* cited by examiner

ENCRYPTION USING BIOMETRIC IMAGE-BASED KEY

CROSS-REFERENCE TO RELATED APPLICATIONS

This application claims the benefit of U.S. provisional application No. 61/897,215, filed Oct. 29, 2013, and further claims the benefit of U.S. provisional application No. 61/939,453, filed Feb. 13, 2014, both of which applications are hereby incorporated by reference herein.

BACKGROUND

As more and more information is recorded, stored, and accessed in electronic form, data security needs have increased. One method that has been employed for controlling access to data is through the use of biometric identifiers of individuals permitted to access data. For example, retinal scanners and fingerprint scanners are commonly used to control access to data. In addition to controlling access to data (e.g., via access to a computer terminal, mobile computing device, or other device or system), biometric scanners are often used to control access to physical locations.

A typical biometric security system includes a scanner, a database of images (e.g., of fingerprints, retinas, etc.) or other conception of the data collected from a biometric scan, and a system for comparing a given scan with the images or other data in the database. Individuals whose scan matches an entry in the database that is permitted access may be allowed to access the data or physical location.

SUMMARY

Because known biometric security systems involve storing the actual biometric image or signature, known biometric systems place sensitive information at risk of permanent loss. If a database or other store of biometric data is compromised, an individual's personal data—data that uniquely and permanently identifies an individual—is available for use against the individual's will. The fingerprint, retina, and other biometric characteristics of an individual cannot be altered. Thus, once such data is compromised, the individual is permanently at risk of identity theft, and the security system from which the data is stolen can no longer use compromised biometric identifiers to grant and deny access.

Methods and systems according to the present disclosure improve upon known biometric security systems by not permanently storing (e.g., for later comparison as in known systems) the actual image of the biometric characteristic. Instead, an image of a biometric identifier (e.g., retina, fingerprint, etc.) may be used to form a key which may be used to secure and provide access to data. The key may be formed, in embodiments, using a neural network and/or a random input (e.g., a vector of random characters), for example. The image of the biometric identifier may be discarded, and thus may not be vulnerable to theft. In an embodiment, the key may be used in a key-based encryption system.

An embodiment of a system for securing data that improves on known systems may include a processor and a non-transitory computer-readable memory storing instructions. When executed by the processor, the instructions may cause the processor to receive a first image of a biometric identifier of a user, convert the first image into a first key, use the first key to encrypt data to create encrypted data, and discard the first image of the biometric identifier. The instructions may further cause the processor to discard the first key. The instructions may further cause the processor to receive a second image of a biometric identifier, convert the second image into a second key, use the second key to attempt to decrypt the encrypted data, and discard the second image. The instructions may further cause the processor to discard the second key.

An embodiment of a method for securing data that improves on known methods may include receiving a first image of a biometric identifier of a user, converting the first image into a first key, using the first key to encrypt data to create encrypted data, and discarding the first image of the biometric identifier. The method may further include discarding the first key. The method may further include receiving a second image of a biometric identifier, converting the second image into a second key, using the second key to attempt to decrypt the encrypted data, and discarding the second image. The method may further include discarding the second key.

Biometric encryption, as described herein, provides distinct advantages over known biometric security and other known encryption systems. Most importantly, because the biometric identifier of the individual is not stored, the biometric characteristic itself is not compromised if the security system is compromised.

DETAILED DESCRIPTION

Figure 1:
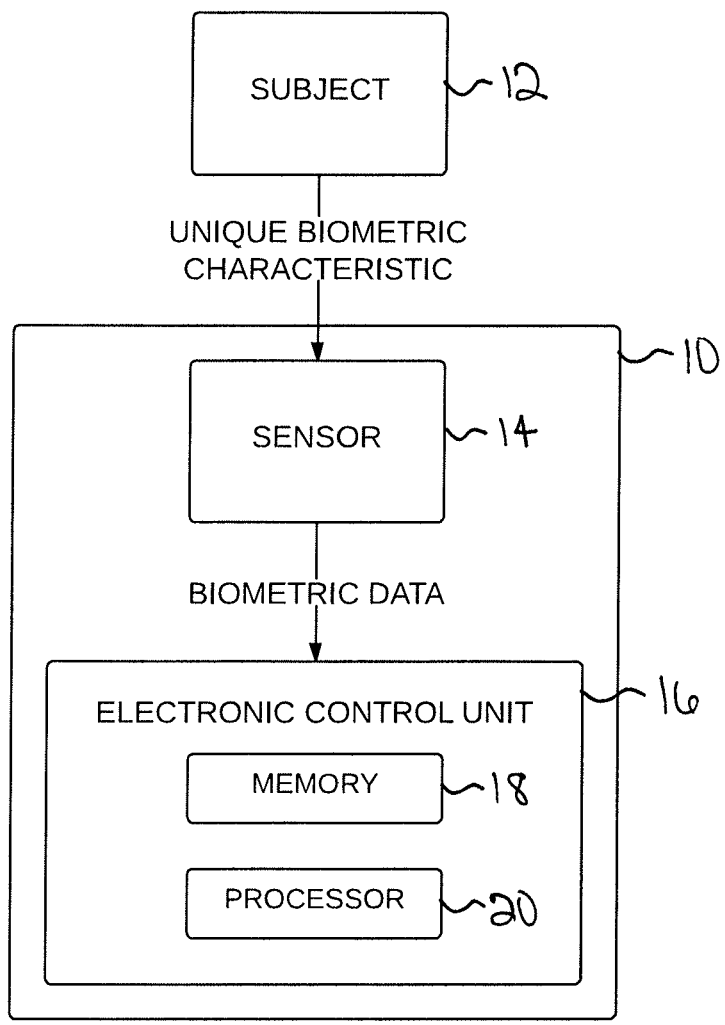
FIG. 1 is a block diagram illustrating a first exemplary embodiment of a biometric security system.

Referring to the drawings, FIG. 1 is a block diagram view of a first exemplary embodiment of a biometric security system 10 configured to receive biometric input from a subject 12 (which may also be referred to herein as a user 12). The biometric input may be a unique biometric identifier of the subject 12. The first system 10 may include a sensor 14 and an electronic control unit (ECU) 16, and the ECU 16 may include a computer-readable memory 18 and a processor 20. The memory 18 may include instructions that, when executed by the processor 20, cause the ECU 16 to perform one or more of the tasks and methods described herein including, but not limited to, providing access to data using a biometric identifier by, for example, encrypting and decrypting data using the biometric identifier.

The sensor 14 may include a biometric characteristic reader, such as a fingerprint reader, retinal scanner, etc. The sensor 14 may output (e.g., to the ECU 16) an image or other data uniquely associated with the biometric characteristic input to the scanner—i.e., each individual scanned by the sensor may result in a different output. The sensor 14 may be arranged to receive input of a unique biometric characteristic from a subject.

The memory 18 may include any type of volatile or non-volatile computer-readable memory that is non-transitory. For example, the memory 18 may comprise a hard disk drive (HDD), random-access memory (RAM), read-only memory (ROM), electrically-erasable programmable read-only memory (EEPROM), FLASH memory, compact disk (CD), digital video disk (DVD), and/or another type of electronic storage medium. The processor 20 may include any type of processor.

In addition to or as an alternative to a processor 20 and memory 18, the ECU 16 may comprise another type of processing device. For example, the ECU 16 may include a field-programmable gate array (FPGA), application-specific integrated circuit (ASIC), programmable logic device (PLD), and/or another type of processing device.

The system 10 may be provided for securing data (e.g., by encrypting and/or controlling access to such data), for controlling access to a physical location, and/or for another security measure. Accordingly, the sensor 14 may be provided in an accessible location for a user. The ECU 16 may be provided substantially in the same location as the sensor 14, or may be remote from the sensor 14. In an embodiment, the ECU 16 may store data that will be or has been encrypted by the ECU 16 according to one or more methods of this disclosure. That is, in an embodiment, the ECU 16 may store the data to which the ECU 16 controls access.

The ECU 16 may be configured (e.g., through instructions stored in the memory 18) to perform one or more tasks or methods shown and/or described herein. For example, the ECU 16 may be configured to perform one or more steps in a method of providing access to data using a biometric identifier.

Figure 2:
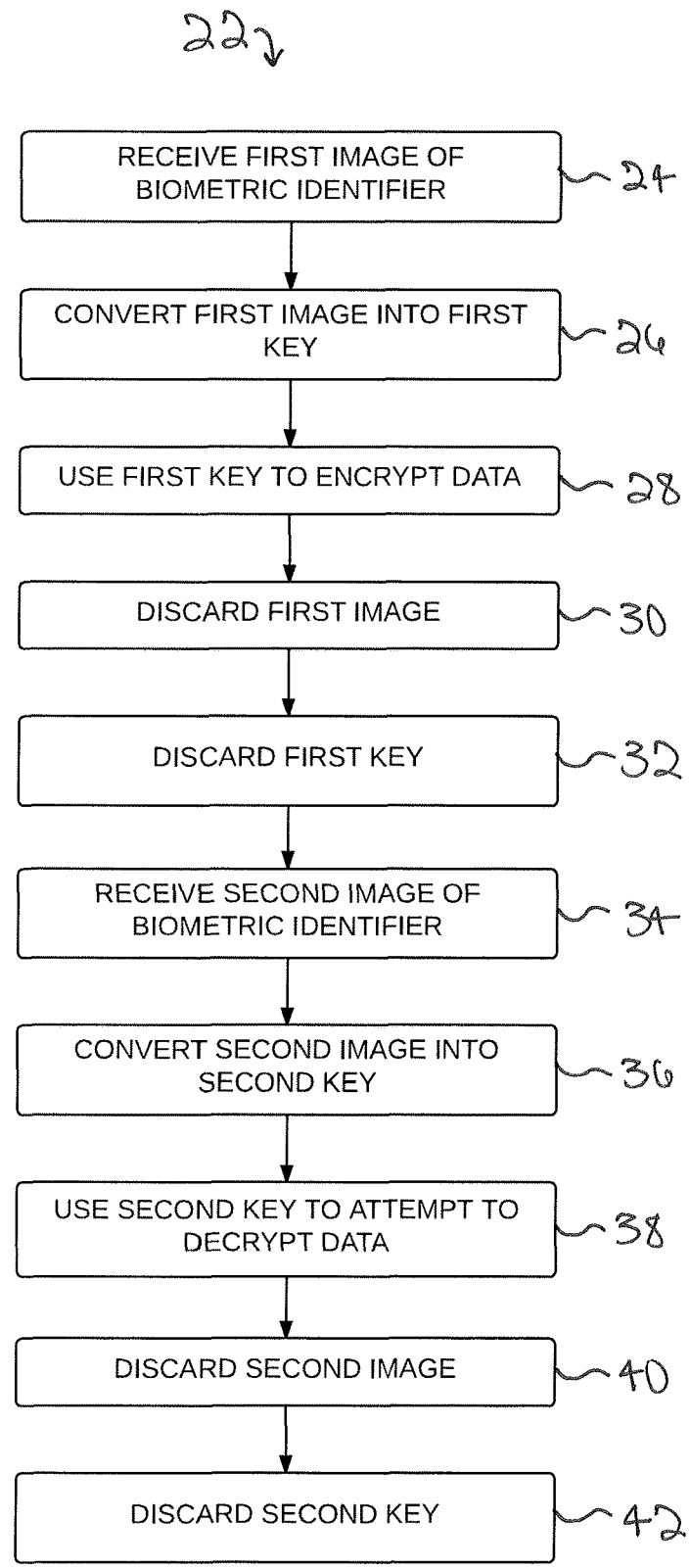
FIG. 2 is a flow chart illustrating a first exemplary embodiment of a method of providing access to data using a biometric identifier.

FIG. 2 is a flow chart illustrating a first method 22 of providing access to data using a biometric identifier. In an embodiment, the first method 22 may additionally or alternatively find use to, for example, secure a physical location or in some other security purpose (as may the second and third methods illustrated in and described with respect to FIGS. 3 and 5 of this disclosure). Accordingly, although the methods of this disclosure will be described with reference to embodiments in which access to data is controlled through encryption and decryption, it should be understood that this disclosure is not so limited.

The first method 22 may begin with a step 24 that includes receiving a first image of a biometric identifier. The first image may be of a fingerprint, retina, or other biometric identifier. The first image may be obtained from or by a sensor, such as the sensor 14 of FIG. 1. The first image may be temporarily stored in memory (e.g., the memory 18 of FIG. 1) for the purposes of converting the first image into a key, then deleted, as set forth in further steps of the first method 22.

The first method 22 may further include a step 26 that includes converting the first image of the biometric identifier into a first key. The first key may be or may include, in an embodiment, a data structure (e.g., a string) that may be used as a parameter for an encryption or decryption algorithm to encrypt or decrypt data other than the key.

The first method 22 may further include a step 28 that includes using the first key to encrypt data, yielding encrypted data. In an embodiment, the first key may be an input for an encryption algorithm, and the data to be encrypted may be a separate input. The encryption algorithm may be or may include, for example, one using a block cipher and/or a stream cipher, in an embodiment. The result of the application of the encryption algorithm to the data may be encrypted data.

The first method 22 may further include a step 30 that includes discarding the first image of the biometric identifier. Discarding the first image may include, in an embodiment, irretrievably removing the first image from one or more memory devices in which it is stored (e.g., from the memory 18 of FIG. 1). In an embodiment, discarding the first image may include irretrievably removing the first image from every memory device in which it is stored (i.e., every memory device in which it is stored that is under the control of a device or system performing the method). For example, discarding the first image may include overwriting sufficient portions of the data that comprises the stored first image so that the first image cannot be retrieved or reassembled from the remaining image data. Still further, in an embodiment, all data comprising the stored first image may be overwritten.

The first method 22 may further include a step 32 that includes discarding the first key. Discarding the first key may include, in an embodiment, irretrievably removing the first key from one or more memory devices in which it is stored. In an embodiment, discarding the first key may include irretrievably removing the first key from every memory device in which it is stored (i.e., every memory device in which it is stored that is under the control of a device or system performing the method). For example, discarding the first key may include overwriting sufficient portions of the data that comprises the stored first key so that the first key cannot be retrieved or reassembled from the remaining first key data. Still further, in an embodiment, all data comprising the first key may be overwritten.

The first method 22 may further include a step 34 that includes receiving a second image of a biometric identifier. The second image may be of a fingerprint, retina, or other biometric identifier. For example, in an embodiment, the second image may be of the same biometric identifier as the first image (i.e., the same fingerprint, retina, etc. of the same individual as the first image). The second image may be obtained from or by a sensor, such as the sensor 14 of FIG. 1. The second image may be temporarily stored in memory (e.g., the memory 18 of FIG. 1) for the purposes of converting the second image into a key, then deleted, as set forth in further steps of the first method.

The first method 22 may further include a step 36 that includes converting the second image of the biometric identifier into a second key. The second key may be or may include, in an embodiment, a data structure (e.g., a string) that may be used as a parameter for an encryption or decryption algorithm to encrypt or decrypt data other than the key.

The first method 22 may further include a step 38 that includes using the second key to attempt to decrypt the encrypted data. In an embodiment, the key may be an input for a decryption algorithm, and the data to be decrypted (i.e., the encrypted data from the encrypted data from the encrypting data step 28 of the first method 22) may be a separate input. If the decryption is successful, the result of applying the decryption algorithm to the encrypted data may be the original, unencrypted data.

The first method 22 may further include a step 40 that includes discarding the second image of the biometric identifier. Discarding the second image may include, in an embodiment, irretrievably removing the second image from one or more memory devices in which it is stored. In an embodiment, discarding the second image may include irretrievably removing the second image from every memory device in which it is stored (i.e., every memory device in which it is stored that is under the control of a device or system performing the method). For example, discarding the second image may include overwriting sufficient portions of the data that comprises the stored second image so that the second image cannot be retrieved or reassembled from the remaining image data. Still further, in an embodiment, all data comprising the stored second image may be overwritten.

The first method 22 may further include a step 42 that includes discarding the second key. Discarding the second key may include, in an embodiment, irretrievably removing the second key from one or more memory devices in which it is stored. In an embodiment, discarding the second key may include irretrievably removing the second key from every non-volatile memory in which it is stored (i.e., every memory device in which it is stored that is under the control of a device or system performing the method). For example, discarding the second key may include overwriting sufficient portions of the data that comprises the stored second key so that the second key cannot be retrieved or reassembled from the remaining second key data. Still further, in an embodiment, all data comprising the second key may be overwritten.

A principle underlying the first method 22 is that, if the biometric identifier in the first image is the same as the biometric identifier in the second image, the encrypted data should be successfully decrypted. Accordingly, the same methods, algorithms, etc. may be applied in the encryption and decryption portions of the first method. For example, the same methods, algorithms, etc. may be applied in converting the first and second images into first and second keys. Similarly, the same encryption scheme may be applied in the encryption step 28 and the decryption step 38, in an embodiment.

The first method 22 may be considered a generic method of providing or controlling access to data that includes biometric-based encryption and decryption of data without ongoing storage of the user's biometric information, thereby improving on known biometric data security systems that store biometric images for comparison. Two further embodiments of methods for providing access to data are provided in this disclosure with respect to FIGS. 3 and 5, respectively, which may be considered more specific embodiments of the first method.

Figure 3:
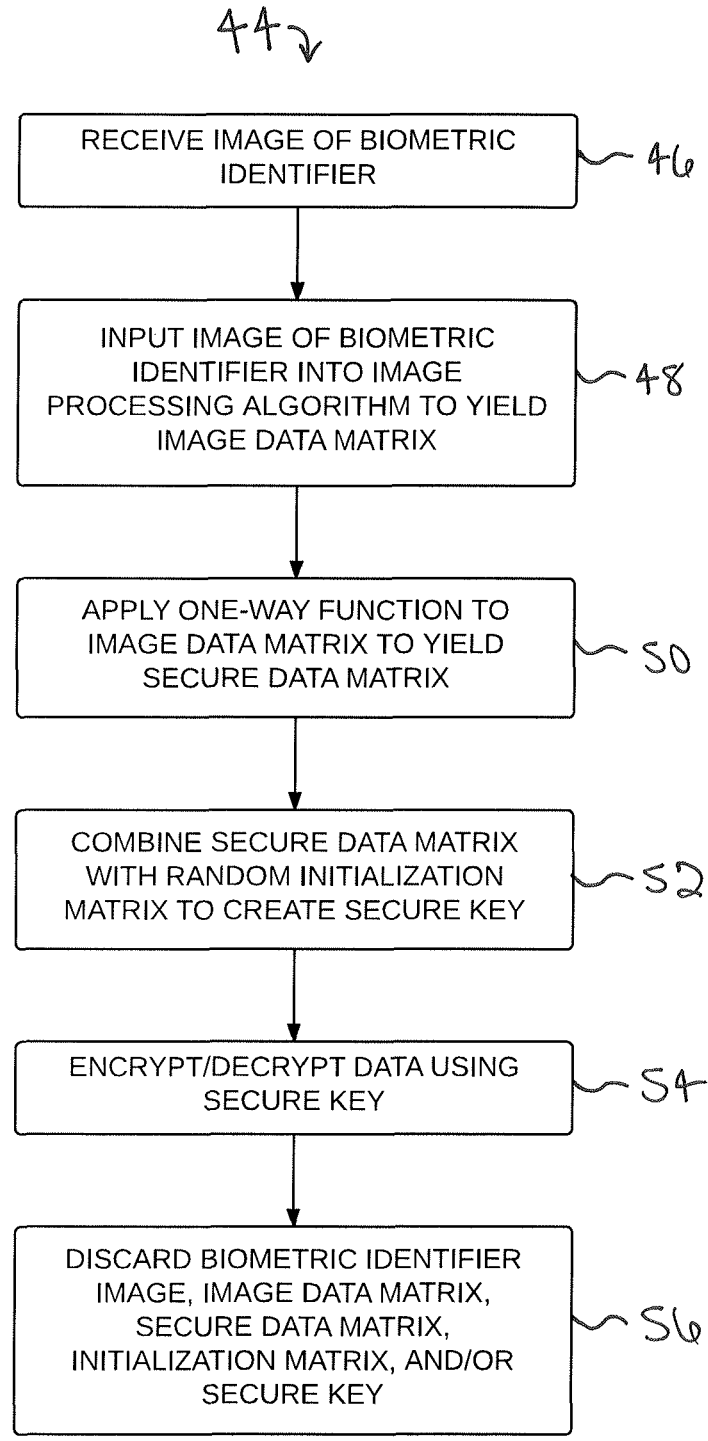
FIG. 3 is a flow chart illustrating a second exemplary embodiment of a method of providing access to data using a biometric identifier.

FIG. 3 is a flow chart illustrating a second method 44 of providing access to data using a biometric identifier. The second method 44 may begin with a step 46 that includes receiving an image of a biometric identifier. The image may be of a fingerprint, retina, or other biometric identifier. The image may be obtained from or by a sensor, such as the sensor 14 of FIG. 1.

With continued reference to FIG. 3, the second method 44 may continue to a step 48 that includes inputting the image of the biometric identifier into an image processing algorithm to yield a matrix of image data. In an embodiment, the image processing algorithm may be or may include a neural network, for example. The matrix of image data may be a vector (i.e., a one-dimensional matrix), in an embodiment. Additionally or alternatively, the image processing algorithm may include another image processing method known or hereafter-developed.

The second method 44 may further include a step 50 that includes applying a one-way function to the image data matrix to yield a secure data matrix. In an embodiment, the one-way function may be or may include a cryptographic hash function, such as SHA or MD5. Of course, another type of hash function, cryptographic or otherwise, or one-way function may be applied. In an embodiment (e.g., where the matrix of image data is a vector, for example), the secure data matrix may be an vector.

A further step 52 in the second method 44 may include combining the secure data matrix with a random or randomized initialization matrix to create a secure key. The initialization matrix may be a vector, in an embodiment. The initialization matrix may be generated according to a random process or a pseudo-random process (i.e., a deterministic process generating a statistically random result). The secure data matrix may be combined with the initialization matrix according to one or more mathematical or logical processes, in an embodiment. For example, the initialization matrix and secure data matrix may be input to an XOR function, the output of which may be the secure key, in an embodiment. Of course, additional or alternative mathematical and/or logical operations may be applied to create the secure key.

The second method 44 may further include a step 54 that includes encrypting or decrypting underlying data using the secure key. The key may be used to encrypt data in any of a number of key-based encryption schemes such as, for example, one using a block cipher and/or a stream cipher.

As noted above, the second method 44 may be used both to encrypt data and to decrypt data. To decrypt data, the user whose biometric identifier was used to encrypt the data may re-enter his or her biometric identifier, and another secure key (i.e., separate from the secure key that was used to encrypt the data) may be generated according to steps 46, 48, 50, 52 of the method, in an embodiment. The initialization matrix used to create the secure key (i.e., in step 52) for decryption may be a different random matrix than was used to create the secure key used for encryption, in an embodiment. In the event that the resulting secure key is not correct (i.e., a decryption performed with the secure key does not yield expected or intelligible data), another secure key may be generated from the biometric identifier (e.g., using yet another different initialization matrix) to attempt to decrypt the data again. In an embodiment, a secure key may be generated multiple times, each key being used in an attempted decryption, before the data is properly decrypted. Additionally or alternatively, in an embodiment, the secure key may be used in a symmetric encryption scheme (e.g., instead of a password in a known password exchange scheme).

The second method 44 may be used, in an embodiment, to generate multiple keys from a single image of a biometric identifier. For example, the secure data matrix generated at step 50 may be combined, separately, with two or more different randomized initialization matrices at step 52, resulting in two or more different keys from the same biometric identifier. Each of the separately generated keys may be used, for example, to secure different data (e.g., different files).

Once the secure key is used, the second method 44 may continue to a step 56 that includes discarding one or more of the biometric identifier image, the image data matrix, the secure data matrix, the initialization matrix, and the secure key. For example, one or more of the biometric identifier image, the image data matrix, the secure data matrix, the initialization matrix, and the secure key may be irretrievably deleted from memory (e.g., overwritten with other data). In an embodiment, one or more of the biometric identifier image, the image data matrix, the secure data matrix, and the initialization matrix may be discarded as the second method 44 is performed (e.g., the biometric identifier image may be discarded once the image data matrix is generated, the image data matrix may be discarded once the secure data matrix is generated, and the secure data matrix and initialization matrix may be discarded once the secure key is generated). In an embodiment, the secure key may be written directly over (i.e., into the same portion of memory as) the image data matrix, the secure data matrix, and/or the initialization matrix.

Keys generated according to the second method may be immune to reverse engineering, in an embodiment—i.e., due to the steps of the method, a key generated according to the second method may not be amenable to reverse engineering to determine the biometric identifier on which the key is based. Accordingly, such a key can safely be stored and/or exchanged in a key-exchange-based encryption system such as, for example, SSL or TLS, in an embodiment.

Figure 4:
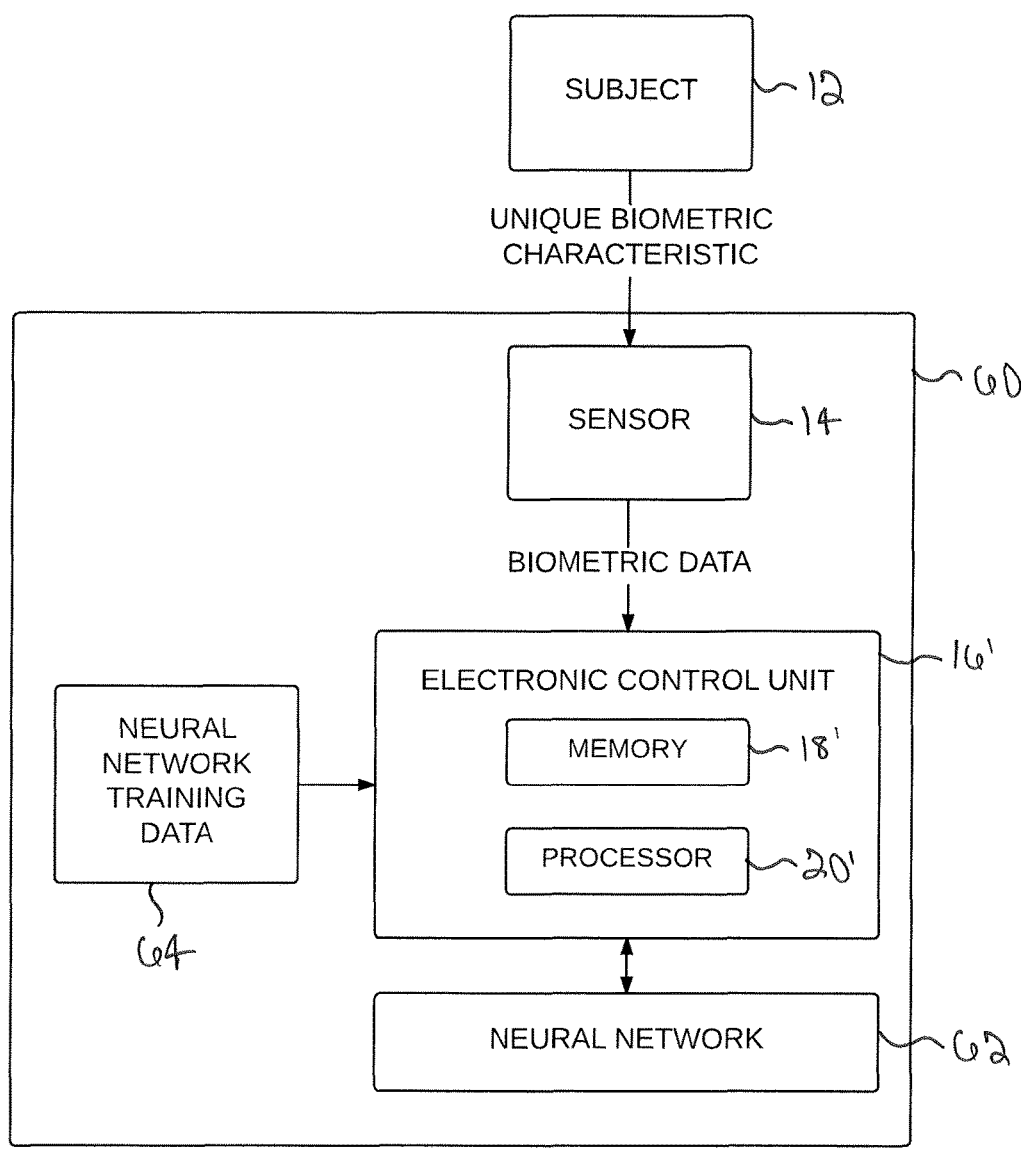
FIG. 4 is a block diagram illustrating a second exemplary embodiment of a biometric security system.

FIG. 4 is a block diagram view of a second exemplary embodiment of a biometric security system 60 configured to receive biometric input from a subject 12. The second system 60 includes some similar components as the first system 10; such components are indicated in prime (') notation. Such similar components should be understood to be substantially the same as the components from the first system 10, but for any alterations necessary to fulfill functions of the second system that are different from the first system.

The system may include a sensor 14, an electronic control unit (ECU) 16', and a source of neural network training data. The ECU 16' may include a computer-readable memory 18' and a processor 20', a neural network 62, and neural network training data 64. The memory 18' may include instructions that, when executed by the processor 20', cause the ECU 16' to perform one or more of the tasks and methods described herein including, but not limited to, providing access to data using a biometric identifier. The system 60 may secure data for a user and provide access to the data for that same user, in an embodiment.

The neural network 62 may be or may include a software-based simulated neural network, in an embodiment. Such a simulated neural network may be programmed according to techniques known in the art or hereafter-developed including, for example, techniques described in Chris Bertram, *Programming in Neural Networks* (2014), which is hereby incorporated by reference, or techniques found in or enabled by the open-source Fast Artificial Neural Network library, created by Steffen Nissen. In such an embodiment, the neural network 62 may be stored as instructions in the memory 18' for execution by the processor 20'.

Additionally or alternatively, the neural network 62 may be or may include a hardware-based neural network. Such a neural network may include, for example, a nanotechnology-based emulated neural network as described in U.S. Pat. No. 7,039,619, which is hereby incorporated by reference. Of course, other hardware-based neural network emulation techniques and systems may be used, in embodiments.

The ECU 16' may be configured to train the neural network 62 using the neural network training data 64, in an embodiment. The training data 64 may be stored, in an embodiment, a database or other storage component. For example, the training data 64 may be stored in the memory 18'. The neural network training data 64 may include generic biometric data, in an embodiment. Such biometric data may be or may include, in an embodiment, a plurality of images of a biometric input, such as retinas, fingerprints, etc. The images may be of biometric identifiers of individuals other than a user that uses the system to secure data.

The ECU 16' may train the neural network 62 according to any known or hereafter-developed neural network training technique. For example, in an embodiment, the neural network 62 may be trained according to one or more of a backpropagation method, a resilient propagation method, the Levenberg-Marquardt Algorithm, or a self-organizing map method. Such techniques are described in Heaton, *Introduction to the Math of Neural Networks* (2012). The neural network 62 may be trained using the biometric data from the neural network training data 64, in an embodiment.

The ECU 16' may be further configured to encrypt, decrypt, and/or otherwise provide access to data according to the biometric identifier of the user 12. Thus, the ECU 16' may be configured to accept a biometric identifier from a user 12 (e.g., through the sensor 14) and to control access to data according to that identifier. For example, the ECU 16' may be configured to perform one or more steps of a method of providing access to data using a biometric identifier.

Figure 5:
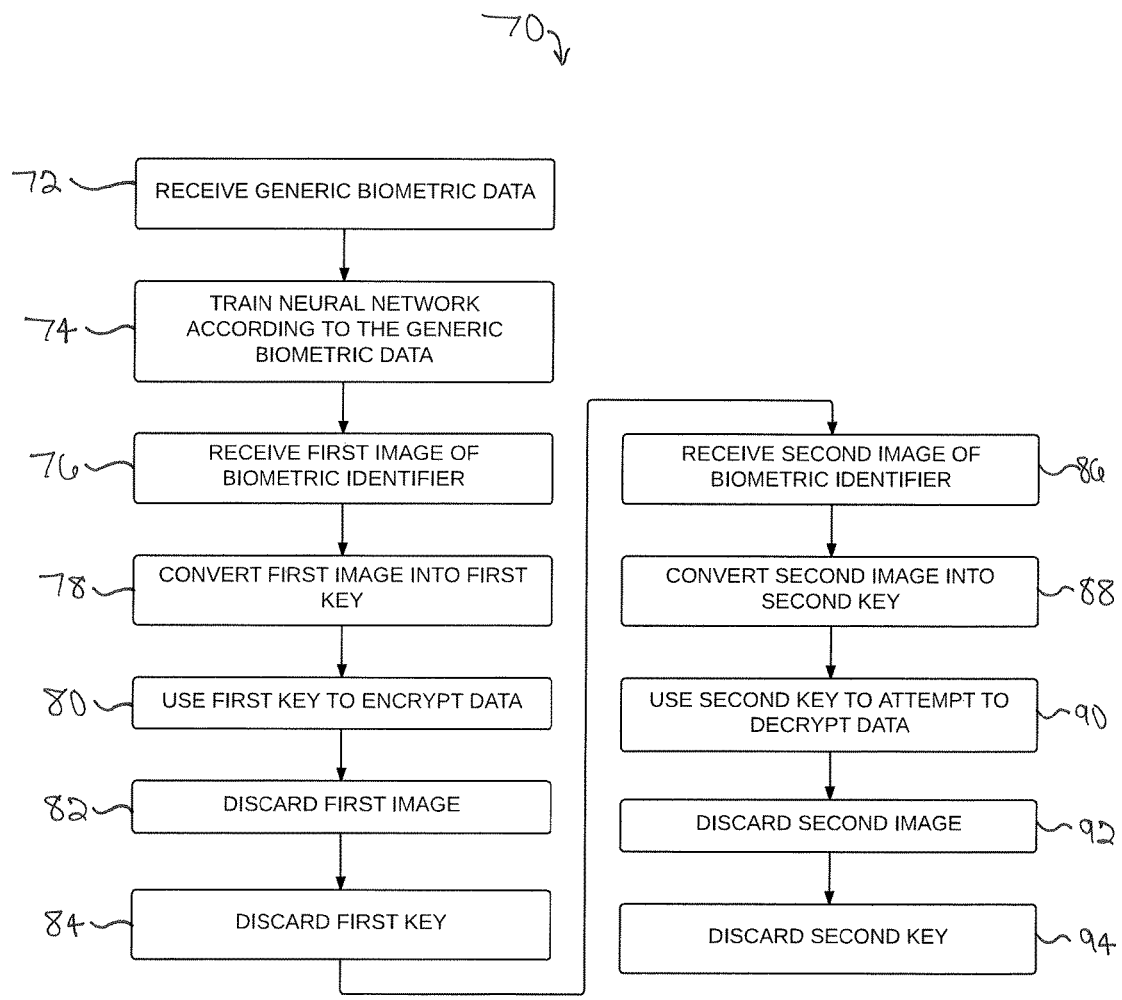
FIG. 5 is a flow chart illustrating a third exemplary embodiment of a method of providing access to data using a biometric identifier.

FIG. 5 is a flow chart illustrating a third exemplary embodiment of a method 70 of providing access to data using a biometric identifier. The third method 70 may begin with a step 72 that includes receiving generic biometric data, such as a set of generic biometric images. The biometric data may be generic in that it is not respective of a user of a system, device, etc. that provides access to data according to the method.

The third method 70 may further include a step 74 that includes training a neural network according to the generic biometric data. The neural network may be trained according to one or more techniques such as, for example only, a backpropagation method, a resilient propagation method, the Levenberg-Marquardt Algorithm, or a self-organizing map method. The neural network may be configured and trained to accept an image of a biometric identifier as input and to output a key unique to that biometric identifier. The key may be, for example, a data structure such as a string.

The third method 70 may further include a step 76 that includes receiving a first image of a biometric identifier of a user. The first biometric image may be or may include an image of, for example, a fingerprint, a retina, etc. The first image may be received from a sensor, such as the sensor 14 of FIG. 4.

The third method 70 may further include a step 78 that includes converting the image of the biometric identifier of the user into a key. For example, the converting step 78 may include using the first image as input for the trained neural network, which may output a key. The key may be in the form of a data structure, such as a string.

The third method 70 may further include a step 80 that includes using the first key to encrypt data, yielding encrypted data. In an embodiment, the first key may be an input for an encryption algorithm, and the data to be encrypted may be a separate input. The encryption algorithm may be, for example, one using a block cipher and/or a stream cipher, in an embodiment. The result of the application of the encryption algorithm to the data may be encrypted data.

The third method 70 may further include a step 82 that includes discarding the first image of the biometric identifier. Discarding the first image may include, in an embodiment, irretrievably removing the first image from one or more memory devices in which it is stored. In an embodiment, discarding the first image may include irretrievably removing the first image from every memory in which it is stored (i.e., every memory device in which it is stored that is under the control of a device or system performing the method). For example, discarding the first image may include overwriting sufficient portions of the data that comprises the stored first image so that the first image cannot be retrieved or reassembled from the remaining image data.

Still further, in an embodiment, all data comprising the stored first image may be overwritten.

The third method 70 may further include a step 84 that includes discarding the first key. Discarding the first key may include, in an embodiment, irretrievably removing the first key from one or more memory devices in which it is stored. In an embodiment, discarding the first key may include irretrievably removing the first key from every memory in which it is stored (i.e., every memory device in which it is stored that is under the control of a device or system performing the method). For example, discarding the first key may include overwriting sufficient portions of the data that comprises the stored first key so that the first key cannot be retrieved or reassembled from the remaining first key data. Still further, in an embodiment, all data comprising the first key may be overwritten.

The third method 70 may further include a step 86 that includes receiving a second image of a biometric identifier. The second image may be of a fingerprint, retina, or other biometric identifier. For example, in an embodiment, the second image may be of the same biometric identifier as the first image (i.e., the same fingerprint, retina, etc. of the same individual as the first image). The second image may be obtained from or by a sensor, such as the sensor 14 of FIG. 4.

The third method 70 may further include a step 88 that include converting the second image of the biometric identifier of the user into a second key. For example, the converting step may include using the second image as input for the trained neural network, which may output the second key. The second key may be in the form of a data structure, such as a string.

The third method 70 may further include a step 90 that includes using the second key to attempt to decrypt the encrypted data. In an embodiment, the second key may be an input for a decryption algorithm, and the encrypted data may be a separate input. The decryption algorithm may be, for example, one using a block cipher and/or a stream cipher, in an embodiment. The result of the decryption algorithm may be the original data that was encrypted in the encryption step of the third method.

The third method 70 and second system 60 advantageously provide a data security implementation that does not require the permanent storage of the biometric identifier of the user. As a result, the use of the user's biometric identifier is not compromised in the event of a data breach. In the event of such a breach (e.g., if the parameters of the neural network used to convert biometric identifiers into keys are compromised), the neural network can simply be re-trained on different generic biometric data. Furthermore, because the keys generated according to the neural network may be discarded 94 after their use, even if a data breach results in the parameters of the neural network being compromised, a user's biometric identifier cannot be reverse-engineered based on the breach.

Securing and providing access to data according to this disclosure provides numerous advantages over known encryption systems. The biometric identifier image and/or initialization matrix may be discarded 92 and/or actively deleted, so in the event of a system breach, a user's biometric identifier may not be available for theft. Further, because encryption may be based on unique biometric identifiers, the system may be secure from breaches of a key or certificate authority involved in the encryption process.

Although a number of embodiments have been described above with a certain degree of particularity, those skilled in the art could make numerous alterations to the disclosed embodiments without departing from the sprit or scope of this disclosure. For example, all joinder referenced (e.g., attached, coupled, connected, and the like) are to be construed broadly and may include intermediate members between a connection of elements and relative movement between elements. As such, joined references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims. As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional.

Any patent, publication, or other disclosure material, in whole or in part, that is said to be incorporated by referenced herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A system comprising:
a processor; and
a non-transitory computer-readable memory storing instructions that, when executed by the processor, cause the processor to:
receive an image of a biometric identifier of a user;
convert the image of the biometric identifier of the user into a key by:
using a neural network, wherein the key is a mathematical representation;
inputting the image of the biometric identifier into an image processing algorithm to yield an image data matrix;
applying a one-way function to the image data matrix to yield a secure image data matrix; and
combining the secure image data matrix with a randomized initialization matrix to create the key and
discard the image of the biometric identifier of the user in response to converting of the image into the key using the neural network.

2. The system of claim 1, wherein the instructions, when executed by the processor, further cause the processor to:
discard the key.

3. The system of claim 1, wherein the instructions, when executed by the processor, further cause the processor to:
convert the image of the biometric identifier of the user into the key by inputting the image of the biometric identifier of the user into a trained neural network.

4. The system of claim 3, wherein the instructions, when executed by the processor, further cause the processor to:
receive a set of generic biometric images that does not include the image of the biometric identifier of the user; and
train a neural network on the set of generic biometric images to yield the trained neural network.

5. The system of claim 1, wherein the image of the biometric identifier of the user is a first image and the key is a first key, further wherein the instructions, when executed by the processor, further cause the processor to:
receive a second image of a biometric identifier;
convert the second image of the biometric identifier into a second key;
use the second key to attempt to decrypt the encrypted data; and
discard the second image of the biometric identifier.

6. The system of claim 5, wherein the instructions, when executed by the processor, further cause the processor to:
convert the second image of the biometric identifier into the second key by inputting the second image of the biometric identifier into a trained neural network.

* * * * *